United States Patent [19]

Wunder

[11] 4,285,384

[45] Aug. 25, 1981

[54] APPARATUS AND METHOD FOR TIE BAR NUT DRIVE SYSTEM

[75] Inventor: William G. Wunder, Hamilton, Mich.

[73] Assignee: Ex-Cell-O Corporation, Troy, Mich.

[21] Appl. No.: 89,829

[22] Filed: Oct. 31, 1979

[51] Int. Cl.³ .................... B22D 17/10; B22D 17/26
[52] U.S. Cl. ...................... 164/1; 29/426.5; 164/154; 164/303; 425/589
[58] Field of Search .............. 164/1, 137, 312, 314, 164/303, 342, 343; 29/426.5; 425/589, 595

[56] References Cited
U.S. PATENT DOCUMENTS

| | | | |
|---|---|---|---|
| 2,541,772 | 2/1951 | Lockard | 83/146 |
| 3,289,282 | 12/1966 | Shaffer | 81/53 R X |
| 3,882,588 | 5/1975 | McFalls et al. | 29/426.5 |
| 4,030,186 | 6/1977 | Myers et al. | 29/426.5 |
| 4,043,016 | 8/1977 | Elkin | 29/240 |
| 4,080,144 | 3/1978 | Hehl | 425/589 X |
| 4,092,881 | 6/1978 | Jurgens et al. | 81/57.39 X |
| 4,256,166 | 3/1981 | Prince | 164/154 |

FOREIGN PATENT DOCUMENTS 1082281 12/1954 France .
707988 4/1954 United Kingdom .

OTHER PUBLICATIONS

B & T Die Casting Machinery, Ex-Cell-O Corp., Micromatic Operations, Mar. 1979.

*Primary Examiner*—Robert D. Baldwin
*Attorney, Agent, or Firm*—John C. Evans; Frank D. Risko

[57] ABSTRACT

An apparatus and method for removing tie bars from a die casting machine. The apparatus and method involves utilizing gearing attached to the tie bar nut whereby the nut is held captive, but is capable of being rotated by an auxiliary drive unit. Further, by utilizing the existing die casting machine functions, it is possible to remove the tie bar from the machine so that the die can be removed and a new die inserted into the die casting machine. By reversing the process the tie bar can now be reinserted into its operating position in the machine and the locking nut rotated to its proper position and locked up.

15 Claims, 9 Drawing Figures

APPARATUS AND METHOD FOR TIE BAR NUT DRIVE SYSTEM

BACKGROUND OF INVENTION

This invention relates to die casting and clamp type machines and more particularly to the method and apparatus for removing a tie bar from the machine by captively removing the tie bar nut by power means. By use of the machine functions and auxiliary tie bar gripping means, a tie bar can be removed from the front plate of the machine so that a mold or die can be removed or inserted into the die casting machine.

In the die casting industry, the tie bar nuts hold the tie bars and the machine platens in rigid alignment when the die is closed and molten metal is shot into the mold cavity. These bars are normally a simple threaded device with machined surfaces on the nut which abut the die casting machine platens. The machines tie bars are under high tension when closed during the shooting of metal into the die cavity to prevent flashing on the part. At this time these tie bars and nuts sustain the full impact of the shot in conjunction with the pre-load stress that is put on the bars of the machine when the machine is closed and locked up. The maximum clamp tonnage or size of a given machine will obviously determine the size of the tie bars and the nuts that are utilized therein. On small machines, the removal of these tie bars and nuts can be done manually without a great deal of difficulty.

When a die is to be inserted or removed from a die casting machine, or for that matter, any type of clamp operated machinery utilizing tie bars, it is sometimes necessary because of the size of the mold itself to remove one or more of the tie bars so that the mold can be removed from the machine. For the small size die casting machines, that is, machines in the range of 450 to 750 ton capacities, the removal of these nuts is done manually by service personnel. However, in larger size die casting machines, such as 850 to 1,500 ton units, it becomes necessary to use nut hangers as a safety device because of the weight of those nuts. The problem is even more accute in units of 3,000 ton capacity and extreme caution must be used. These tie bar nuts weigh approximately 350 pounds each and therefore, it is difficult to unthread, hold and remove the nut from the tie bar. Further, the physical size of the tie bar in a 3,000 ton machine for example is approximately 14 inches in diameter and the nut 22 inches across. The removal of this tie bar and nut from the machine therefore becomes a complicated and difficult task.

In my invention, a geared member has been fastened to the outside periphery of the tie bar nut by a key means. This gear member is then driven by a second gear in mesh with it via a worm gearing mechanism connected to a hydraulic motor. This mechanism allows the tie bar nut, therefore, to be rotated by this power drive means to remove the nut from the tie bar itself. Means are provided to hold the nut captive to the platen of the machine while the nut is rotated which literally will push the tie bar out of the machine when the nut is rotated.

Such mechanisms using gearing are not new. British Pat. No. 707,988, shows a manual system whereby the coupling and decoupling of pipe ends can be accomplished using threaded members which have external gearing associated with them. A similar gearing mechanism is shown in U.S. Pat. No. 2,541,772 which shows a gearing means associated with die stripping plates for removing the stripper plate nut which is inconveniently located in such a mechanism. The U.S. Pat. No. 3,289,282 entitled Apparatus For Dismantling and Assembling Roll Assemblies shows an automatic means for removing threaded members from roll assemblies wherein a drive coupling engages with a geared member associated with the roll coupling and is automatically rotated to remove the threaded coupling from the roll assembly. U.S. Pat. No. 4,092,881 titled Apparatus For Making Up and Breaking Threaded Pipe Connections shows a system whereby a chuck can be released and clamped about threaded tubular members. A cylinder is energized which rotates and breaks the coupling between the pipe connections. This is cited since a similar actuator mechanism is used in the process of my invention.

SUMMARY

According to the objects of my invention, a threaded tie bar nut having a geared member keyed to its periphery is driven through a powered operated means whereby the threaded nut can be rotated in regard to the tie bar. A second mechanism associated with the tie bar nut holds the tie bar nut and retains it in its approximate normal working or locked position. Another object of the invention is an auxiliary tie bar locking means which keep the tie bar and nut in a locked position. This lock is released before the nut starts rotating. As the nut rotates the tie bar will be pushed in a rearward direction causing it to be partially pushed out of the machine platen. After the bar reaches the end of the tie bar nut and further rotation of the nut will no longer be effective, the power means is stopped and the machine functions are then utilized in conjunction with a clamping means associated with the moving plate to pull the tie bar. By actuating the moving plate rearwardly the tie bar will be pulled from the front plate. This will be continued by sequentially closing and opening the machine until the tie bar is pulled from the platen.

It is the further object of this invention to have a locking screw means associated with the tie bar and nut whereby the tie bar and nut can be held in close assembly so that tension is maintained on the tie bar and tie bar nut when it is normal operating use.

It is further the object of this invention to keep the tie bar nut captive to the platen so that it will maintain its machine position when it is being rotated so it will push the tie bar rearward. It is a further object of this invention to have a plurality of these mechanisms associated with the die casting machine so that the mold can be removed from the machine either from the operator side of the machine or the helper side of the machine. It is the further object of this invention that these mechanisms could be associated with all tie bars in the machine. It is the further object of this invention to provide switching means and cylinder means for automatically rotating or clamping or unclamping means for operating the invention. It is the object of this invention that two bars could simultaneously be pulled from the machine.

Other objects and advantages of the invention will be hereafter described or become apparent to those skilled in the art and the novel features of the invention will be defined in the appended claims.

DESCRIPTION

Figure 1A:
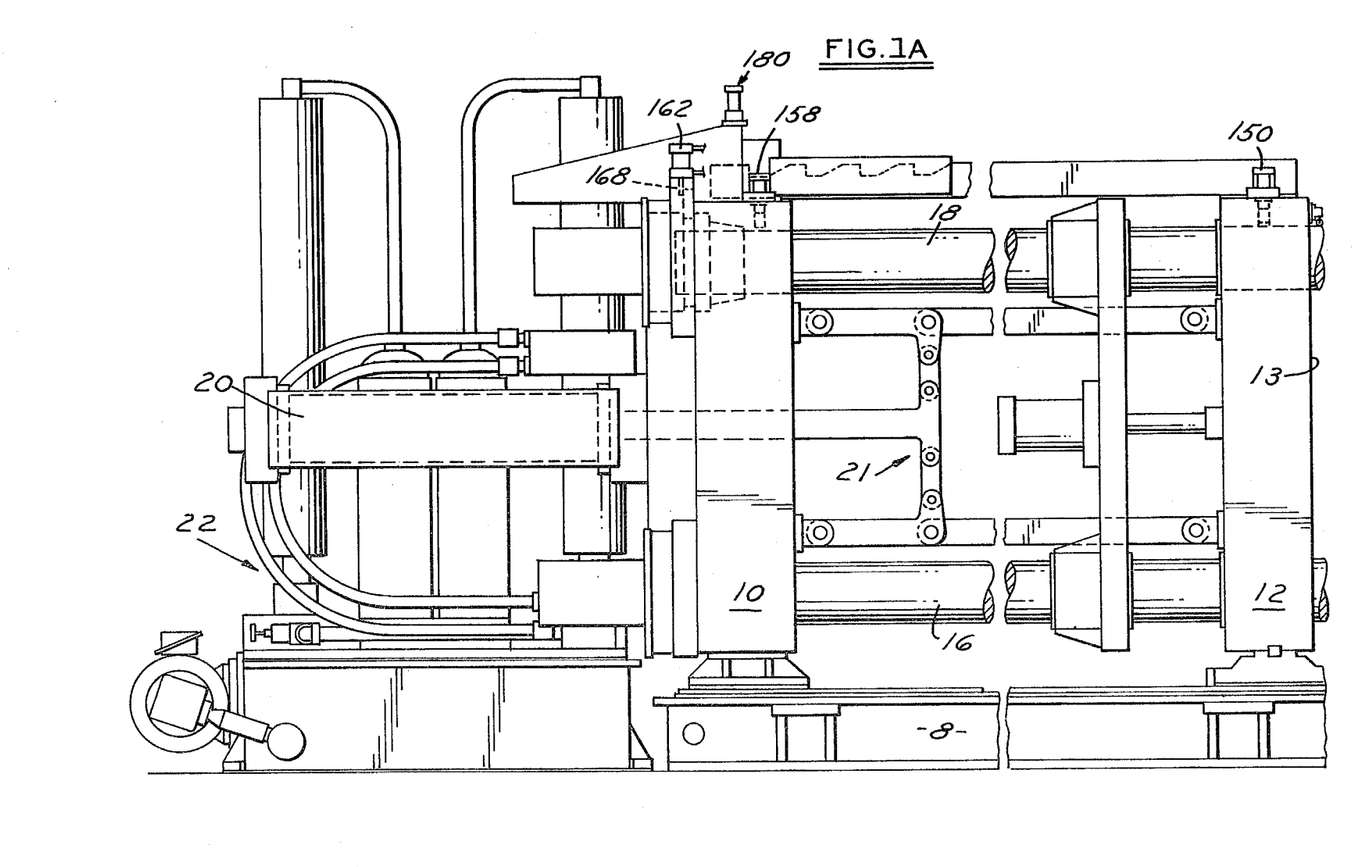
FIG. 1(A) is a side view of a typical die casting machine illustrating the significant elements of the machine.
Figure 1B:
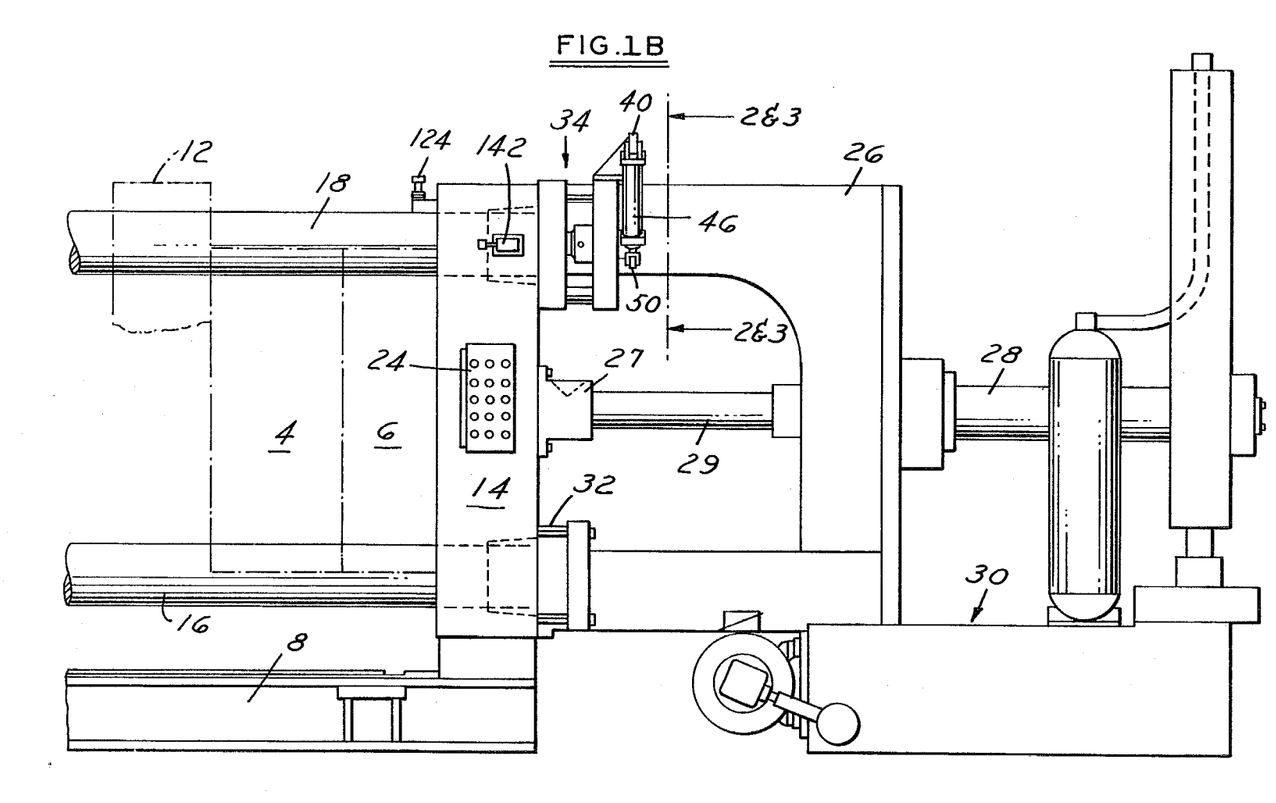
FIG. 1(B) is a continuation of the side view.

Referring now to FIG. 1(A) and 1(B) which shows a large die casting machine, in this case a 3,000 ton unit, bed 8 supports the rear platen 10, movable plate 12 and front platen 14. Associated with the platens are the lower tie bar 16 and upper tie bar 18 which go from the front platen 14 through the moveable plate 12 and extending into the rear platen 10. In this machine are actually four such tie bars, two upper bars and two lower bars. Die half 4 is shown mounted to moving plate 12. Die closed cylinder assembly 20 is mounted to the rear platen 10 and operates the toggle linkage assembly 21 for moving plate 12 to open and close the die (die halves 4 and 6) shown in phantom. The power to operate the toggle linkage 21 through hydraulic cylinder 20 is supplied by hydraulic power supply 22. The details of this hydraulic power supply, as well as the cylinder and toggle linkages, are well known in the art and will not be discussed in detail. Mounted to the front platen 14 is die half 6 and control station 24 which controls the various functions and movements of the machine. Attached also to front platen 14 is "C" frame assembly 26 which supports the shot cylinder assembly 28 and ram assembly 29. Cold chamber 27 is shown attached to platen 14 into which is poured the die casting material for injection into the die assembly. The shot cylinder assembly 28 is powered by hydraulic fluid which is supplied by hydraulic power supply 30 which is shown in FIG. 1(B). The lower tie bar nut assembly 32 is shown attached to tie bar 16 and the upper tie bar nut assembly 34 is shown attached to tie bar 18 in conjunction with platen 14. The nut assembly 34 are shown attached to both upper bars in FIG. 2.

Figure 3:
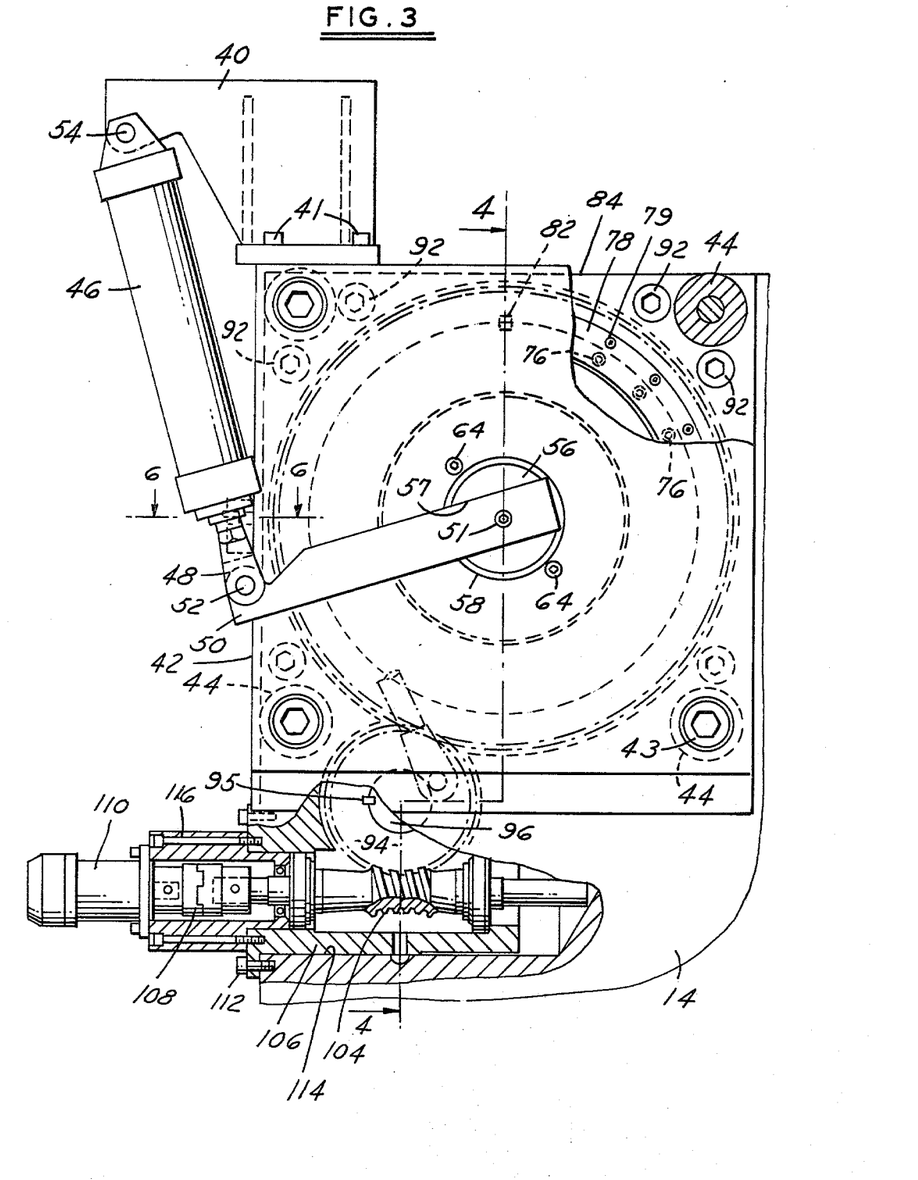
FIG. 3 is an enlarged detailed view along line 3—3 in FIG. 1(B) showing the gearing means associated with the invention.
Figures 4, 5:
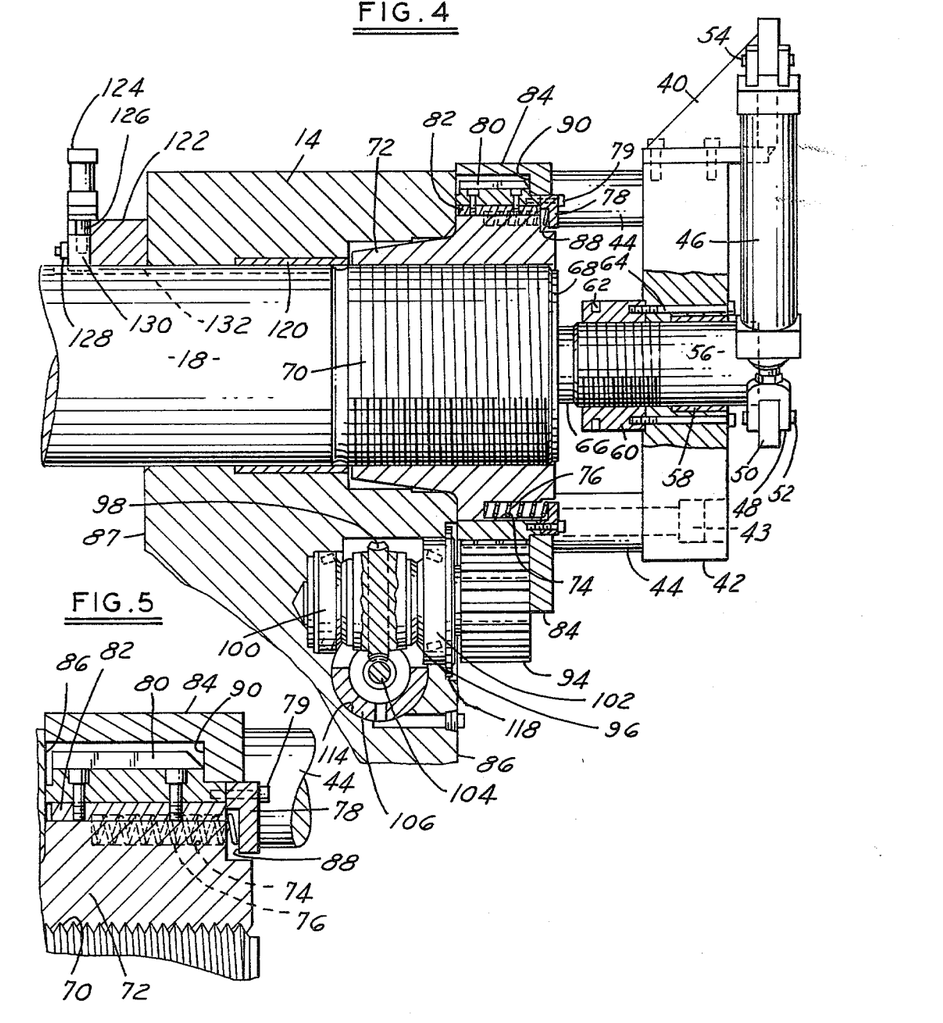
FIG. 4 is a sectional view taken along line 4—4 of FIG. 3.
FIG. 5 is an enlarged sectional view of the retaining nut and biasing means.

FIG. 3 is a front view of tie bar nut assembly 34 which shows the various details of the unit. FIG. 4 shows a sectional view of the tie bar nut assembly of FIG. 3. Referring now to these figures, lock plate 42 can be seen attached to the front platen surface 86 via spacers 44 and screws 43. Mounted atop lock plate 42 is cylinder support 40 fastened to the lockplate by screws 41. Cylinder 46 is afixed to support 40 by pivot pin 54 at the head end and attached to the rod end is clevis rod 48 which is attached to torque arm 50 via clevis pin 52. The torque arm 50 is attached to load screw 56 by screw 51. The torque arm 50 fits into slot 57 in load screw 56. Load screw 56 has a diameter 66 extending beyond its threads and is supported in load screw bushing 58 which is located in the lock plate 42. Load screw nut 60 is held in position against lock plate 42 by screws 64. In the screw nut 60 are a series of threaded holes 15° apart for receiving screws 64. This allows for fine adjustment of nut 60 or if wear occurs. Spanner holes 62 are shown on the periphery of load screw nut 60. The end of the load screw nut diameter 66 locks up load screw 56 when contact is made with surface 68 of tie bar 18. On the end of tie bar 18 are shown threads 70 which engage tie bar nut 72. On the outside diameter of tie bar nut 72 is nut gear 80 which is a slip fit over nut 72 and is held in place by key 82. (See FIG. 5) Key 82 is bolted to nut gear 80 and also is a slip fit in nut 72. Spring retainer 78 is held to nut gear 80 by screws 79. Also a series of bores 74 containing springs 76 are located around the periphery of tie bar nut 72 and held in place by spring retainer 78. Gear retainer 84 is held to platen 14 by screws 92 best seen in FIG. 3. The retainer 84 bears up against surface 86 of platen 14 and nut gear 80 is in running contact with surface 90. A cutaway section in FIG. 3 also shows the springs 76 and the spring retainer 78.

Mating with nut gear 80 is drive gear 94 which is affixedly held to gear shaft 96 by key 95. This gear shaft 96 is supported by bearings 101 and 102 mounted in the front platen 14 and held in place by bearing retainer 118. Worm gear 98 is affixedly held to shaft 96 and engages worm shaft 104. This shaft can best be seen in FIG. 3. The worm shaft is and its associated hardware is mounted in worm adjusting sleeve 106 which is affixedly held to platen 14 via screws 112 and piloted in sleeve bore 114. A mounting adapter 116 is affixed to worm adjusting sleeve 106 to which is mounted hydraulic motor 110. The hydraulic motor 110 and worm shaft 104 are connected by flexible coupling 108. The hydraulic motor is connected to a source of hydraulic fluid, however, this is not shown.

Referring now to FIG. 4, tie bar 18 has a slot 132 into which guide pin 130 rests. Hydraulic cylinder 124 is attached to front platen 14 via guide block 122. Cylinder rod 126 is attached to guide pin 130 and it is held in position by guide plate 128 which is affixed to guide block 122. The purpose of this guide pin in the tie bar is to prevent rotation of the tie bar when the lock nut 72 is rotating.

Figure 6:
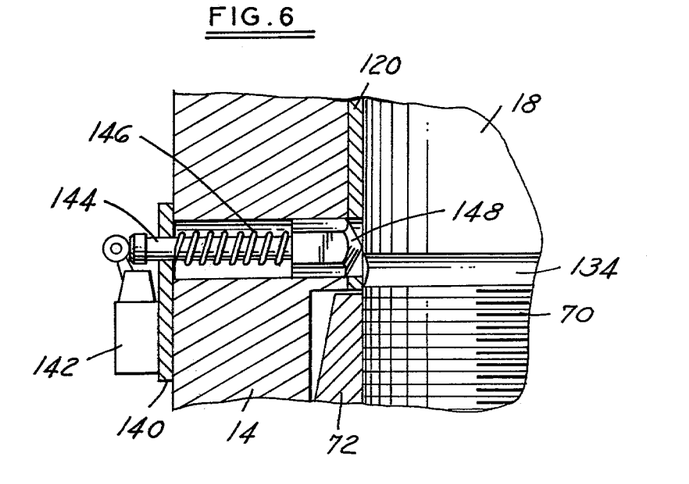
FIG. 6 is a sectional view taken along line 6—6 in FIG. 3 showing a limit switch.

In FIG. 6 is shown limit switch 142 which is affixedly held to limit switch plate 140. The limit switch and plate are mounted to front platen 14. As can be seen actuator rod 144 has an actuator tip 148 which bears on the diameter of tie bar 18. Spring 146 biases the actuator rod 144 to be in contact with the tie bar. This limit switch 142 is used to signal the location of the tie bar in the platen.

Figures 2, 8:
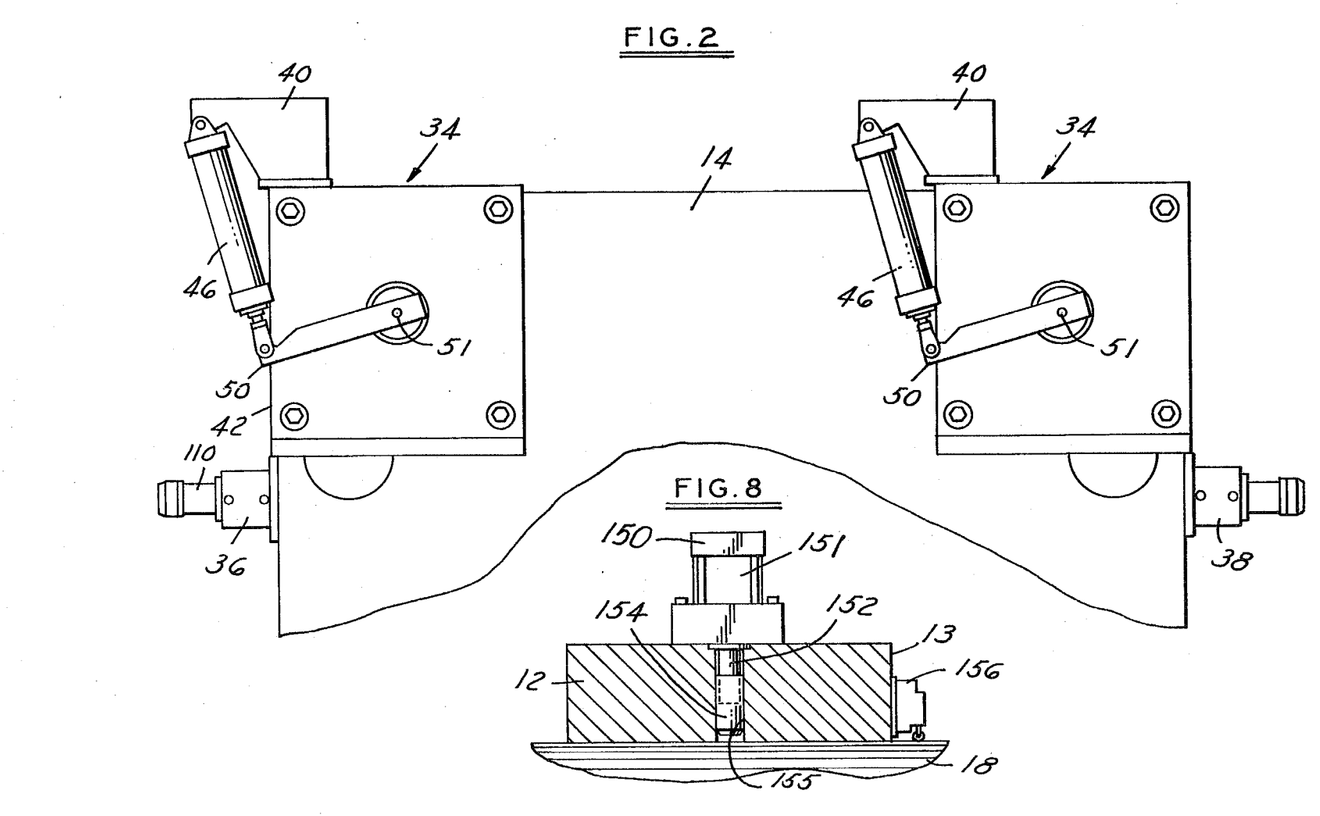
FIG. 2 is a view of the front platen along line 2—2 in FIG. 1(B) showing a locking means associated with the invention.
FIG. 8 is a sectional view of the moving platen clamping means.
Figure 7:
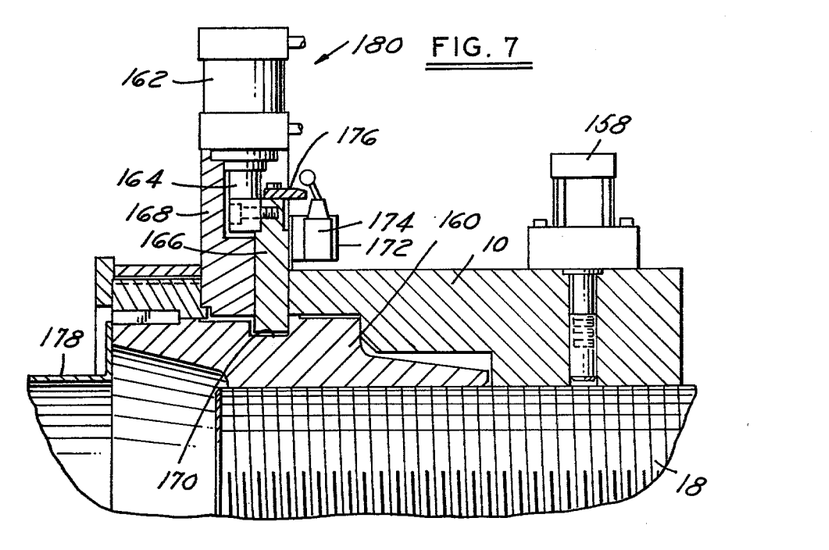
FIG. 7 is a sectional view of the rear tie bar nut, associated stop blade assembly, and rear platen clamping means.

Shown in FIG. 8 is tie bar clamp cylinder assembly 150 which is affixedly held to the moving platen 12. Cylinder 151 is connected to cylinder rod 152 which is connected to locking bar 154 which is guided in bore 155. Also shown and mounted to the front surface 13 of moving plate 12 is limit switch 156. This switch is used in conjunction with tie bar removal. A similar cylinder assembly 158 is seen in FIG. 1(A) and FIG. 7. This assembly is mounted to the rear platen 10 and has functionally the same parts as the cylinder assembly 150 shown in FIG. 8. This cylinder assembly 158 clamps the tie bar in the rear platen during the tie bar removal operation.

Also seen in FIG. 7 is rear nut retainer assembly 180. The mounting block 168 is affixedly held to rear platen 10. Mounted atop mounting block 168 is hydraulic cylinder 162. The rod end 164 of cylinder 162 is affixed to stop blade 166. The stop blade 166 is shown engaging slot 170 in the rear tie bar nut 160. To the mounting block 168 is mounted limit switch bracket 172. Onto this bracket 172 is mounted limit switch 174. To the upper end of stop blade 166 is mounted stop blade actuator 176. Tie bar shield 178 is affixedly held to the rear tie bar nut 160. Only a single retainer assembly 180 is shown, however, these are usually operated in pairs 180° apart. That is, there would be two cylinders, two stop plates, switches, etc.

OPERATION

To remove a tie bar from the machine whether for maintenance purposes or to remove a mold from a machine, the machine will first be closed to the full lock-up tonnage of the unit. This will increase tension on the tie bar and remove the locking force from load screw 56. The mold to be removed is closed and can be bolted or strapped together if it is to be removed as a unit, otherwise each mold half will be removed separately. The platen surfaces, as is well known in the art, usually consists of a series of T-slots into which T-bolts are placed. Slotted clamps fasten the edges of the mold to the respective platen surface. If the molds have been clamped together, the bolts and clamps would be removed from surface 13 of the moving platen 12 which now allows moving platen 12 to move free of the mold which is not attached to platen 14. If the mold is to be removed in separate parts no connections between mold halves would occur. The normal position of the tie bar 18 and load screw 56 is best seen in FIG. 4. Here, load screw 56 has the end of its diameter 66 in contact with tie bar surface 68. In normal operation this load screw means is tight against tie bar surface 68 with cylinder 46 being moved to its upward most position shown in FIG. 3. The purpose of this pressure is to cause the threads of tie bar nut 72 to have all of the tolerances taken up in one direction thereby causing tie bar nut 72 to engage surface 86 of platen 14. When it is ready to now remove tie bar 18, the hydraulic cylinder 46 is energized causing its rod end to move into the position shown in phantom in FIG. 3. This movement rotates the torque arm 50, counter clockwise as viewed, which is engaging slot 57 in load screw 56. Since the load screw nut 60 is affixedly held to the lock plate 42, the load screw nut 60 cannot move and therefore the load screw 56 moves out or away from tie bar surface 68 leaving a small gap between the two elements. The side play at the pivot pin 54 end and clevis pin 52 end allow this movement. With the load now released between the tie bar nut 72 and the platen 14, the machine is now opened slightly and the rear nut retainer assembly 180 actuated. Hydraulic cylinder 162 in FIG. 7 would be energized and the stop blade 166 would disengage groove 170 in tie bar nut 160. A signal from the safety limit switch 172 which is engaged by stop blade actuator 176 will signal that the stop blade 166 has disengaged.

The machine is now switched to operate in the inch mode. That is, the movement of the traveling plate 12 will be very slow so that its position can be carefully controlled.

Hydraulic motor 110 shown in FIG. 3 is now energized. Driving through coupling 108, worm 104 will rotate the gear shaft 96 via worm gear 98. As the shaft is rotated, drive gear 94, which is engaging nut gear 80 will begin to rotate slowly counter clockwise. Nut gear 80 which is keyed to tie bar nut 72 by key 82 will begin to unthread from threads 70 on tie bar 18. As the gear and tie bar nut start to rotate, the nut 72 will begin to move away from the platen 14 sliding on gear nut 80. The biasing springs 76 and the spring retainer 78 maintain a tension between the nut gear 80 and the tie bar nut 72. The end of the nut gear is in contact the gear retainer surface 90. When the tie bar nut 72 made contact with surface 88 of retainer 78 the tie bar would then start to move away from the load screw 56 and begin moving toward the rear of the machine. As viewed in FIG. 4, tie bar 18 would be moving to the left.

As the tie bar 18 is being pushed away from the front nut 72, the tie bar shield attached to tie bar nut 160 and its associated hardware would be pushed to the left as viewed in FIG. 7. Since there is no physical contact holding the tie bar nut 160 to platen 10, it will be pushed to the left as tie bar nut 72 is being rotated. Cylinder assembly 124 would have its guide pin 130 shown in FIG. 4 engaging slot 132 in tie bar 118 maintaining it from rotating and thereby allowing it to be moved axially without rotation. As the tie bar continues to move to the left the actuator rod 144 with the actuator tip 148 in contact with tie bar 18 will keep limit switch 142 in the upper or off position as shown in FIG. 6. When the end of the tie bar threads 70 are reached, the tie bar 18 will stop moving but the nut will continue rotating. The motor 110 will now be de-energized. The moving platen clamp assembly 150 is energized to clamp the tie bar to the platen and the machine is cycled open. This operation will start pulling the tie bar from platen 14. As soon as the end of thread 70 (see FIG. 6) clears the actuator tip 148, limit switch 142 will disengage or signal that the bar is past that switch point and cylinder rod assembly 124 will now be actuated pulling guide pin 130 from slot 132. After the machine is opened, cylinder 150 will be de-energized releasing the clamping of locking bar 154 from the outside diameter of tie rod 18 and rear clamp cylinder 158 now energized clamping tie rod 18 in rear platen 10. Hydraulic cylinder 20 will then be energized and via toggle linkage assembly 21 will move platen 12 toward the front platen 14 or to the right as viewed in FIG. 1(A). This movement will then proceed to move the platen along the tie bar 18 to a new position. Clamp cylinder 158 will be de-energized when platen 12 is in its full forward position, cylinder 150 will again be energized clamping the locking bar 154 to cylinder 18 and again the die closed cylinder 20 will be energized pulling platen 12 toward the rear. This process of energizing and de-energizing cylinder 150 and 158 and actuating the die closed cylinder 20 to open and close the machine will continue until the tie bar has been pulled from the front platen 14. The cycling will continue until the point where limit switch 156 shown in FIg. 8 engages thread runout groove 134. This will prevent the threads 70 of tie bar 18 from entering the moving platen 12. Cylinders 150 and 158 will now be energized holding tie bar 18 in position with the die closed cylinder in the rear most position, that is, in a direction to the extreme left.

The mold can now be removed from the front platen by removing the T-bolts and clamps which were holding the mold in position on platen 14. After the mold has been removed and a new mold inserted in the machine, the reverse procedure which has just been described would occur and the tie bar would now be pushed forward or to the right as viewed in FIGS 1(A) and 1(B). As stated earlier the machine would be operating in the inch mode and tie bar clamp cylinders 150 and 158 would be alternately energized to hold the tie bar as appropriate to complete the task. As the tie bar is reinserted into the front platen 14, it would continue to move until it engaged actuator rod 144 which would then energize switch 142. This would be the signal that the hydraulic motor 110 can now be energized. The motor unit would then begin rotating the nut gear 80 and hence the tie bar nut 72 in the opposite direction causing it to be turned onto the threads. If the tie bar is moving and doesn't engage the nut 72, the nut will slide in gear 80 until the lead thread picks up. The clearance between surface 88 and nut 72 is sufficient to allow two turns of the nut before full compression of springs 76. As nut 72 starts pulling the tie bar, clamp cylinder 150 is released. Also, cylinder 124 would be energized inserting guide pin 130 into slot 132 to prevent rotation of tie bar 18 during the rotating operation of the tie bars nut 72. The completion of the threading of tie bar nut 72 onto threads 70 will be observed until the nut is positioned to the pre-set factory marked location so the front platen would have the proper squareness. Cylinder 46 would then be energized and torque arm 50 would cause load screw 56 to be rotated causing the load screw 56 to properly stress tie bar threads 70 and the tie bar nut 72 to firmly engage surface 86 of platen 14.

As seen in FIG. 2, an upper tie bar nut assembly is shown on both the left and right hand tie bars as viewed in that Figure. A drive assembly 48 is shown for the right hand unit and drive assembly 36 is shown for the left hand unit. These drive assemblies are in essence the worm gear drive and hydraulic motor with coupling assemblies which have been already discussed.

It is possible, if necessary, for both upper tie bars to be removed from the machine simultaneously and such interconnecting circuitry would be contained in control panel 24. As can be seen in FIG. 2, a duplicate of all of the mechanism shown in FIG. 3 does exist on the right hand member and therefore that particular tie bar could have been removed just as the previous operation of removing the upper left hand tie bar. It should also be noted that after the tie bar is firmly in position, cylinder 162 would be energized to move the stop blade 166 into contact with slot 170 in rear tie bar nut 160 to complete lock up of the tie bar and nuts in the machine.

In summary then the front locking nut is contained in its normal position for tie bar engagement and is driven by a ring gear keyed to its outside diameter. A gear reducer unit provides the required torque or power through a spur gear to turn the nut on or off the tie bar. The nut itself is contained on the front platen so that when it is rotated, the tie bar will move toward the rear of the unit until it is released from the nut completely. Operating the movable platen to the open position, with holding means therein for securing the tie bar to this platen, will now remove the tie bar from its position adjacent to the nut. The tie bar is secured to the rear platen and released from the traveling platen and the machine closed. Subsequent opening and closing of the platen and clamping of the tie bar will cause the bar to be removed from the front platen and clear of the die area. This will enable the operator to easily replace a mold mounted in the machine. Reversing the procedure will allow the tie bar to be restored to its operating position.

None of the details of the hydraulics for operating the unit have been shown, however, all of these are well known in the art and therefore it is not believed necessary to show them.

While the specific details of the preferred embodiment illustrated of the invention have been shown and described, changes and alterations may be made without departing from the spirit and scope of the invention.

I claim:

1. An apparatus for use with a threaded fastener in a clamp type machine having a front and rear platen spaced apart and with a moveable platen therebetween wherein said fastener includes a threaded member having front locking nut means and rear locking nut means used for restraining said front and said rear platens, the improvement comprising means for removing and holding said front locking nut means of said threaded fastener captive on said front platen of said machine, said holding means supporting said front locking nut means in engaging contact with said front platen during removal of said front locking nut means, a ring gear means in sliding engagement on said front locking nut means is connected to a speed reducer means which can operatively disengage and engage said front locking nut means from said threaded member.

2. The apparatus of claim 1 wherein an actuator operated guide means is affixed to said front platen and guide means engages said threaded member to prevent rotation of said member during engagement or disengagement of said front locking nut means.

3. The apparatus of claim 1 or 2 wherein said holding means comprises a plate means wherein said ring gear is operatively retained to said front platen by said plate means and a biasing means interconnects said front nut means to said ring gear means.

4. The apparatus of claim 2 wherein a first switch means operates upon the complete disengagement of said threaded member from said front locking nut means, said first switch means operatively engaging said actuator means whereby said guide means is disengaged from said threaded member.

5. The apparatus of claim 4 wherein a gripping means is mounted in said movable platen of said machine and is operatively connected to engage said threaded member, a second switch means is mounted on said moveable platen and operatively connected to said threaded member.

6. The apparatus of claim 1 having means for disengaging a stop means connected to said rear locking nut means on said threaded member.

7. The apparatus of claim 3 comprising a mounting plate affixedly held to said front platen having an axial force means connected therein for exerting an axial force to the end of said threaded member wherein, said axial force means is operated by a power means to exert or remove said axial force.

8. The apparatus of claim 7 wherein said power means is a hydraulic cylinder connected to said mounting plate means and having the rod end connected to a torque arm means affixedly held to said axial force means.

9. The apparatus for moving a tie bar means in a die casting machine having a front and rear platen spaced apart with a travelling platen therebetween comprising a means for operatively rotating a front load nut means on threads of said tie bar means, a rear locking retainer means operatively connected to said tie bar means, retaining means for holding and supporting said front load nut means in position to said front platen, tie bar clamp means in said rear platen and a tie bar clamp means in said travelling platen, means engaging said tie bar means to prevent tie bar rotation, control means to operatively cycle said power operated front nut means and said travelling platen and said tie bar clamp means in sequence for moving said tie bar.

10. The apparatus of claim 9 comprising a first switch means on said front platen to detect the end of said tie bar means, a second switch means located on said travelling platen to detect said tie bar threads and a third switch means on said rear platen to detect the unlocking of said rear locking retainer means.

11. The method for removing a tie bar means from the front platen of a die casting machine having a front and rear platen with a moving platen therebetween, a locking load screw means engaging said tie bar means, a front load nut means on the threads of said tie bar means, power operated means for operatively rotating said front load nut means, a retaining means for holding and supporting said front load nut in position to said front platen, a rear load nut means on said tie bar means having a locking retainer means operatively connected to said rear load nut means and said rear platen, tie bar clamp means associated with both said rear platen and said travelling plate, guide means affixed to said front platen engaging said tie bar means to prevent tie bar rotation, a first switch means on said front platen to detect the end of said tie bar means, a second switch means located on said moving platen to detect said tie bar threads and a third switch means on said rear platen to detect the unlocking of said rear locking retainer means comprising the steps of:
  (a) closing the machine to full lock-up tonnage;
  (b) withdrawing said locking load screw means from engaging said tie bar means and withdrawing said locking retainer means from said rear load nut means;
  (c) partially opening the machine wherein the locking load is removed from said tie bar;
  (d) removing said front load nut means from said tie bar threads by rotating said load nut means by said power operated means whereby said tie bar is moved toward rear of said machine and continuing said rotation until said load nut means disengages said tie bar threads and the moving of said tie bar stops;
  (e) disengaging said guide means from said tie bar;
  (f) energizing said rear platen tie bar clamp means and closing machine;
  (g) energizing said moving platen tie bar clamp means, deenergizing said rear platen tie bar clamp means and opening machine; and
  (h) repeating steps (f) and (g) until said tie bar is removed from said front platen and clear of die area.

12. The method of claim 11 wherein said first switch means is activated upon opening of machine after step (g).

13. The method of claim 12 wherein said second switch is activated upon closing of machine after step (h).

14. The method for reinserting a tie bar means into the front platen of a die casting machine having a front and rear platen with a moving platen therebetween, a locking load screw means, a power operated means for rotating the front load nut means onto the threads of said tie bar means, a retaining means for holding and supporting said front load nut in position to said front platen, a rear load nut means on said tie bar means having a locking retainer means operatively connected to said rear load nut means and said rear platen, tie bar clamp means associated with both said rear platen and said moving platen of said machine, guide means affixed to said front platen for engaging said tie bar means to prevent tie bar rotation, a first switch means in said front platen to detect the end of said tie bar means, a second switch means located on said moving platen to detect the tie bar threads and comprising the steps of:
  (a) energizing said moving platen tie bar clamp means, and slowly closing machine;
  (b) energizing rear platen tie bar clamp means, de-energizing said moving platen tie bar clamp means and opening machine;
  (c) repeating steps (a) and (b) until said tie bar engages said first switch means which causes said power operated means to rotate said front load nut means;
  (d) upon engaging said front load nut means with tie bar means, de-energizing said moving plate tie bar clamp means and engaging said guide means in said tie bar;
  (e) disengaging said power operated means upon seating of said tie bar in position and closing machine to locking tonnage;
  (f) actuating said locking load screw means; and
  (g) actuating said rear locking retainer means.

15. The method for removing and inserting a tie bar means in the front platen of a die casting machine having a front and rear platen with a moving platen therebetween, a locking load screw means, a power operated means for operatively rotating a front load nut means on threads of said tie bar means, a rear locking retainer, a retaining means for holding and supporting said front load nut in position to said front platen, a rear load nut means connected to said tie bar means having a locking retainer means operatively associated to said rear platen, tie bar clamp means associated with both said rear platen and said moving platen of said machine, guide means affixed to said front platen for engaging said tie bar means to prevent tie bar rotation, a first switch means in said front platen to detect the end of said tie bar means, a second switch means located on said moving platen to detect the said tie bar threads and a third switch means on said rear platen to detect the unlocking of said rear locking retainer means and comprising the steps of:
  (a) closing the machine to full lock-up tonnage;
  (b) withdrawing said locking load screw means from engaging said tie bar means and withdrawing said locking retainer means from said rear load nut means;
  (c) partially opening the machine wherein the locking load is removed from said tie bar;
  (d) removing said front load nut means from said tie bar threads by rotating said load nut means by said power operated means, whereby said tie bar is pushed toward rear of said machine and continuing said rotation until said load nut means disengages said tie bar threads and the pushing of said tie bar stops;
  (e) disengaging said guide means from said tie bar;
  (f) energizing said rear platen tie bar clamp means and closing machine;

(g) energizing said moving platen tie bar clamp means, deenergizing said rear platen tie bar clamp means and opening machine;

(h) repeating steps (f) and (g) until said tie bar is removed from said front platen and clear of die area.

(i) energizing said moving platen tie bar clamp means, and slowly closing machine;

(j) energizing rear platen tie bar clamp means, de-energizing said moving platen tie bar clamp means and opening machine;

(k) repeating steps (i) and (j) until said tie bar engages said first switch means which causes said power operated means to rotate said front load nut means;

(l) upon engaging said front load nut means with tie bar means, de-energizing said moving plate tie bar clamp means and engaging said guide means in said tie bar;

(m) disengaging said power operated means upon seating of said tie bar in position and closing machine to locking tonnage;

(n) actuating said locking load screw means; and (o) actuating said rear locking retainer means.

* * * * *